Jan. 3, 1939.    R. C. JONES    2,142,514
VACUUM BRAKE BOOSTER
Filed July 30, 1937
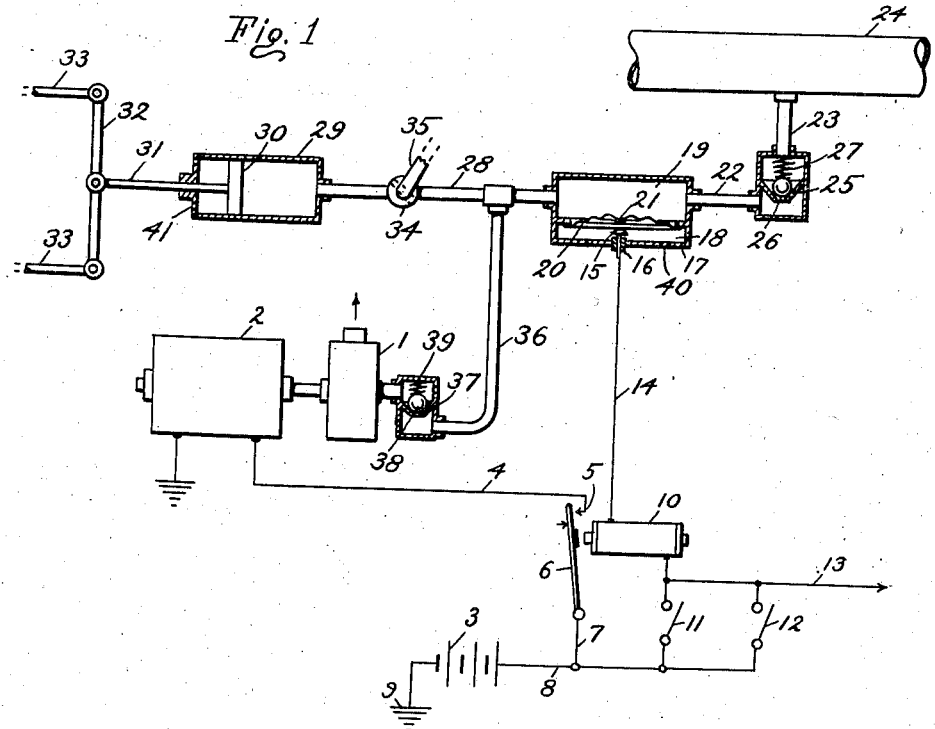
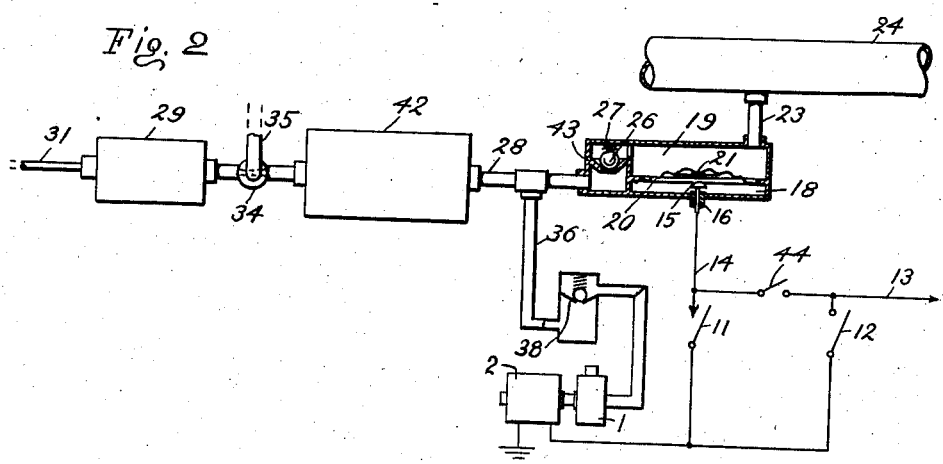
Robert C. Jones
INVENTOR
BY John P. Nikonow
ATTORNEY Patented Jan. 3, 1939

2,142,514

UNITED STATES PATENT OFFICE 2,142,514

VACUUM BRAKE BOOSTER

Robert C. Jones, Brooklyn, N. Y., assignor, by direct and mesne assignments, of fifty-five per cent to Elmon C. Gillette, seven and one-half per cent to Milton H. Goldson, and seven and one-half per cent to Samuel Moanfeldt, all of New York, N. Y.

Application July 30, 1937, Serial No. 156,476

3 Claims. (Cl. 188—152)

My invention relates to vacuum brake boosters and has particular reference to boosters for vacuum brakes used on automotive vehicles.

Vacuum brakes derive their power from the atmospheric pressure acting on one side of a piston in a cylinder the other side of which is evacuated. Vacuum in the cylinder is created by the engine suction on the intake stroke, for which purpose the brake cylinder is connected with the engine manifold.

It follows therefore that the vacuum brake can operate only when the engine is running. As a safety measure, a vacuum tank sometimes is used with vacuum brakes, the tank being of a sufficient capacity to insure the operation of the brake for some time after the engine has stopped. Such tanks, however, must be necessarily heavy and bulky, and even then they can be effective for only a short time. They cannot, for instance, insure the satisfactory operation of the brakes when a vehicle with vacuum brakes descends a long hill and the engine becomes stalled in such manner that it cannot be started again by the inertia of the vehicle. This may happen in a variety of cases, as, for instance, in cases of a damage to the crankshaft, to the driving shaft, gears, clutch, universal joints, seizure of any of the bearings in the engine or transmission, seizure of a piston in the cylinder through lack of lubrication or overheating, etc. In all such cases, if the engine becomes stalled or cannot turn, the brakes will fail, immediately if there is no reserve vacuum tank, or after a short interval of time if such a tank is used. In any case, the operation of a vehicle with vacuum brakes will be far from being 100% safe.

It is an object of my invention, therefore, to provide an auxiliary vacuum-creating device or booster which will render the brakes operative for an indefinitely long time if the engine becomes stalled or cannot be made to turn through some defect or damage. For this purpose I provide a small vacuum pump connected with an electric motor which can be operated by an ignition battery of an automotive vehicle, the pump being connected to the power cylinder vacuum feeder pipe line of the brake through a manually operable valve of an ordinary construction as used with the vacuum brakes. Other auxiliary devices may be also included between the pump and the power cylinder, but for the sake of convenience, in the description and claims the pump will be described as connected with the cylinder.

Another object of my invention is to provide means to automatically disconnect the engine manifold from the brake system when the engine is not running. For this purpose I provide a one-way valve (or check valve) in the pipe connecting the intake manifold with the brake controlling valve.

Another object of my invention is to provide means to automatically disconnect the vacuum pump from the brake system when the engine is not operating. For this purpose I provide a one-way or check valve in a pipe connecting the pump with the brake system or with the controlling valve.

Another object of my invention is to provide means to close the electric circuit for the pump motor when the engine is not running, i. e. when there is insufficient vacuum in the intake manifold. For this purpose I provide an electric switch operated by a flexible diaphragm, one side of the diaphragm being exposed to the vacuum in the manifold, the other side being open to the atmosphere. The switch is made to close the circuit for the motor, preferably through a suitable relay, when there is insufficient vacuum in the manifold.

Another object of my invention is to provide means to render the electric motor operative only when the ignition switch is closed. A manually operable switch is provided, however, for closing the circuit of the motor when it is desired to use the brakes without starting the engine as, for instance, when moving a car in a garage or towing, or in case the hand brake becomes accidentally released while the vehicle is parked.

Still another object of my invention is to provide a combined vacuum valve and electric switch operated by a flexible diaphragm and adapted to close the electric circuit for the pump motor when the engine is not running, making at the same time proper connections between the pipes from the intake manifold, vacuum brake and the booster pump.

My invention is more fully described in the accompanying specification and drawing in which—

Fig. 1 is a diagrammatic view of my vacuum booster system.

Fig. 2 is a similar view of a modified arrangement.

My vacuum brake booster consists of a vacuum pump 1 connected with an electric motor 2 adapted to be operated by an ordinary storage battery as used on automotive vehicles for starting, lighting and ignition 3. The motor is connected by a lead 4 with a contact point 5 which can be engaged by a contact arm 6 connected by a lead 7 to a lead 8 of the battery, the other battery terminal being grounded at 9 according to the practice of such installations on automotive vehicles. The arm 6 is attracted by a magnet coil 10 one side of which is connected with switches 11 and 12, the latter being an ordinary ignition switch for an ignition circuit 13. The other side of the coil is connected by a lead 14 with a contact member 15 held in an insulation bushing 16 in a casing 17. The switch 11 is used when the ignition switch 12 is disconnected and it is desired to use the brakes.

The casing 17 is divided in two compartments 18 and 19 by flexible diaphragm 20 having a contact point 21 in the middle touching the point 15 when the diaphragm is not under tension. The compartment 19 is connected by pipes 22 and 23 with an exhaust manifold 24 of an automobile engine (not shown). A one-way or check valve 25 is placed between the pipes 22 and 23 and contains a ball 26 pressed by a spring 27 against the valve seat. The latter is positioned so that a suction in the manifold tends to raise the ball thereby opening the valve. The other side of the casing 19 is connected by pipe 28 with a power cylinder 29. A piston 30 slides in the cylinder and is connected by rod 31 with a cross bar 32 operating brake rods 33. A valve 34 is placed in the pipe 28 and has a handle 35 operatively connected to a brake pedal (not shown). The pipe 28 is also connected with a pipe 36 extending from the intake side of the vacuum pump 1. A one-way check valve 37 is placed in the pipe 36 and comprises a ball 38 pressed by spring 39 against the valve seat.

The operation of my apparatus is as follows:

The switches 11 and 12 are usually disconnected when the automotive vehicle is standing still and the engine is not running. There being no vacuum in the manifold 24, the diaphragm 20 will rest by its point 21 on the point 15. For starting the engine, the ignition switch 12 is closed thereby closing the circuit for the relay 10. The latter, however, will be immediately disconnected again with the first few turns of the engine when vacuum is created in the manifold 24 and, as a result, the diaphragm 20 will be drawn into the compartment 19 by the air pressure on its outer side, the air being admitted into compartment 18 through holes 40 in the casing 17, disconnecting the points 15 and 21. The engine suction will keep the ball 26 raised from the seat of the valve 25 thereby establishing a communication between the manifold 24 and the cylinder 29 subject to control by the brake valve 34. This valve is opened by depressing the brake pedal thereby establishing vacuum in the cylinder 29. The piston 30 will accordingly be forced to move into the cylinder by the atmospheric pressure through the holes 41, pulling on the bar 32 and rods 33 for tightening the brakes. The suction in the pipe 36 will tend to keep the ball 38 drawn tightly against the seat of the valve 37 thereby disconnecting the pump 1 from the line 28. It should be noted that the diaphragm 20 remains in its flexed or inoperative position during all the time when the engine is running. As soon as the engine stops, however, air will enter the manifold 24 causing the valve 25 to be closed by the ball 26 thereby disconnecting the manifold from the vacuum line 28. The air pressure in the vacuum line 28 will be sufficiently raised however to permit the diaphragm 20 to straighten out, bringing the point 21 in contact with the point 15.

The circuit will therefore be closed through the relay coil 10 if the ignition switch 12 is still closed. Should it be opened, however, and it is desired to use the vacuum brake, the manual switch 11 may be closed keeping the coil 10 in circuit. The magnet coil 10, being energized, will attract arm 6 closing the circuit for the motor 2 through the leads 8, 7, 4 and the contact point 5. The motor will turn the pump 1 creating suction and opening the valve 37 thereby restoring vacuum in the line 28. The vacuum brake will be operative again as long as the motor is running. The motor will stop, of course, as soon as the normal vacuum is restored in the chamber 19 and it will be running only at intermittent periods automatically maintaining the required vacuum with a relatively small consumption of the electric power. This will prevent any possibility of an accident in case the engine becomes inoperative when the vehicle descends a more or less long hill. The manual switch 11 may be used to advantage for moving the vehicle around without using its engine or when the vehicle is being towed for a more or less long distance, as, for instance, for repairs.

A modified construction is shown in Fig. 2 in which a reserve vacuum tank 42 is provided in the line 28 back of the valve 34. The valve 25 is omitted and a valve 43 is placed between the chamber 19 and the pipe 28. The vacuum tank is of a sufficient size to permit operation of the brake for a certain length of time in case of the engine stoppage or failure, supplementing the booster action of the vacuum pump. The chamber 19 in this case is permanently connected with the manifold 24 but becomes disconnected from the pipe 28 when there is no vacuum in the manifold, in which case the valve 43 becomes closed. In the operation of this modified device, the motor 2 turns continuously as long as the switch 11 or 12 is closed, this arrangement being preferred when the brakes may be required for only short periods of time. The motor 2 is connected with the battery 3 through the vacuum switch 15, the relay in this case being omitted. A supplementary switch 44 may be provided in order to disconnect the motor 2 from the line when starting the engine for the first time thereby avoiding the simultaneous starting of the motor 2.

It is understood, of course, that the vacuum tank may be omitted.

It is also understood that my system can be used for other mechanisms employing vacuum cylinders, such as vacuum operated clutches, transmission gear shift etc.

I claim as my invention:

1. A vacuum booster for a vacuum brake having a power cylinder connected with the intake manifold of an automobile engine, comprising a vacuum pump, an electric motor operatively connected with the pump, a pipe connecting the pump with the cylinder, a check valve in the pipe adapted to disconnect the pump from the cylinder when there is vacuum in the manifold, an air operated switch having an air chamber connected to the manifold by a pipe for unrestricted air flow and adapted to connect the motor with a source of electric current when vacuum in the manifold is reduced below a predetermined value, and a check valve in the pipe between the air chamber of the switch and the cylinder.

2. A vacuum booster for a vacuum brake having a power cylinder connected with the intake manifold of an automobile engine, comprising a vacuum pump, an electric motor operatively connected with the pump, a pipe connecting the pump with the cylinder, a valve means for disconnecting the pump from the cylinder when there is vacuum in the manifold, a fluid operated switch having a chamber connected to the manifold for unrestricted air flow and adapted to connect the motor with a source of electric current when vacuum in the manifold is reduced below a predetermined value, and means to disconnect the chamber from the cylinder when vacuum in the manifold is reduced below said predetermined value.

3. A vacuum booster for a vacuum brake having a power cylinder connected with the intake manifold of an automobile engine comprising a vacuum pump, an electric motor operatively connected with the pump, a pipe connecting the pump with the cylinder, a valve means for disconnecting the pump from the cylinder when there is vacuum in the manifold, a diaphragm switch having a chamber connected to the manifold for unrestricted air flow and adapted to connect the motor with a source of electric current when vacuum in the manifold is reduced below a predetermined value, and means to disconnect the chamber from the cylinder when vacuum in the manifold is reduced below said predetermined value.

ROBERT C. JONES.